United States Patent [19]

Parker

[11] Patent Number: 4,945,649
[45] Date of Patent: Aug. 7, 1990

[54] ANGLE GAGE

[76] Inventor: Kirk P. Parker, 9141 Loma St., Villa Park, Calif. 92667

[21] Appl. No.: 448,685

[22] Filed: Dec. 11, 1989

[51] Int. Cl.⁵ .............................................. G01B 3/56
[52] U.S. Cl. ...................................... 33/534; 33/562; 33/199 R
[58] Field of Search ................. 33/534, 535, 562, 563, 33/567, 833, 199 R, 501.05, 501.08, 501.45

[56] References Cited

U.S. PATENT DOCUMENTS

| | | | |
|---|---|---|---|
| 284,702 | 9/1883 | Wyke | 33/199 R |
| 904,003 | 11/1908 | Naldrett . | |
| 987,703 | 3/1911 | Curtin | 33/562 |
| 1,696,149 | 12/1928 | Danly . | |
| 2,212,802 | 8/1940 | Walicki | 33/199 R |
| 2,645,858 | 7/1953 | Davis | 33/174 |
| 4,060,900 | 12/1977 | Greenwood | 33/75 |
| 4,461,092 | 7/1984 | Hore | 33/474 |
| 4,490,916 | 1/1985 | Blum | 33/174 |
| 4,497,119 | 2/1985 | Dearman | 33/464 |
| 4,625,427 | 12/1986 | Rine | 33/534 |
| 4,637,142 | 1/1987 | Baker | 33/833 |
| 4,660,293 | 4/1987 | Kovacs | 33/471 |

OTHER PUBLICATIONS

A. C. Beheringer, Inc., Brown & Sharpe Shop Tool Manual, pp. 142, 143, 148, 149, 150 (date unknown).
Mitutoyo Measuring Instruments, Catalog No. 9000, pp. 328, 329, 350, 351 (date unknown).
Garrett Industrial Supply Co., Starrett Pecision Tools, Gages and Saws First Edition Catalog No. 28, pp. 200, 201 (unknown).

Primary Examiner—William A. Cuchlinski, Jr.
Assistant Examiner—Patrick R. Scanlon
Attorney, Agent, or Firm—Fulwider, Patton, Lee & Utecht

[57] ABSTRACT

An angle gage with which the accuracy of a specified angle can be checked in a variety of orientations or forms. The nine-sided flat and rigid template not only enables the interior as well as the exterior forms of a particular angle to be gauged, but the same gage can be used to check the corresponding chamfer angle, the angle's supplement and the half-angle. The compact size and advantageous placement of the various corners and edges provides an extremely versatile, inexpensive and easy-to-use checking tool. A set of such gages corresponding to an incremented range of angles enables angle measurement of most contours to be made.

6 Claims, 2 Drawing Sheets

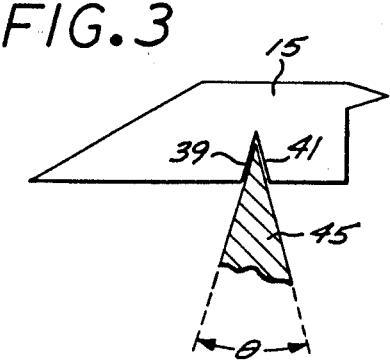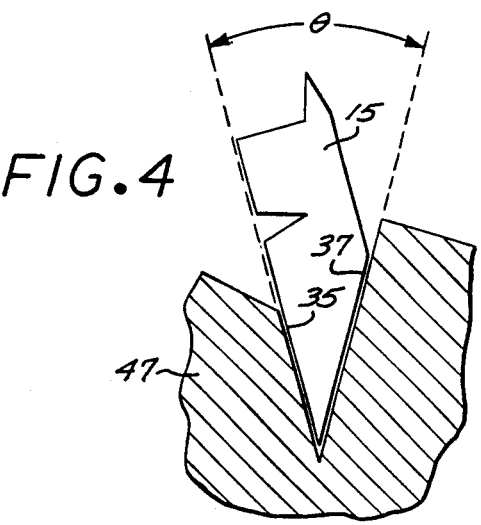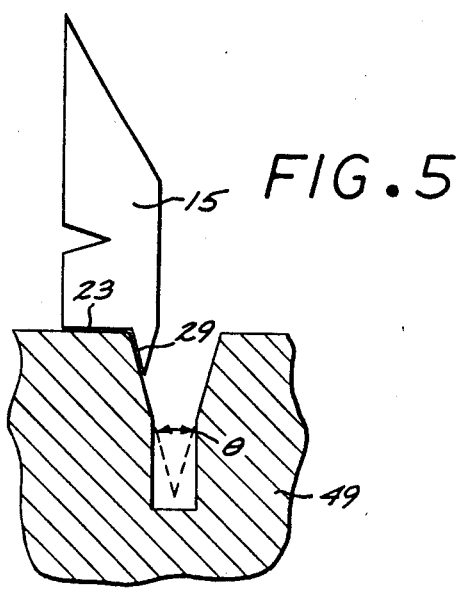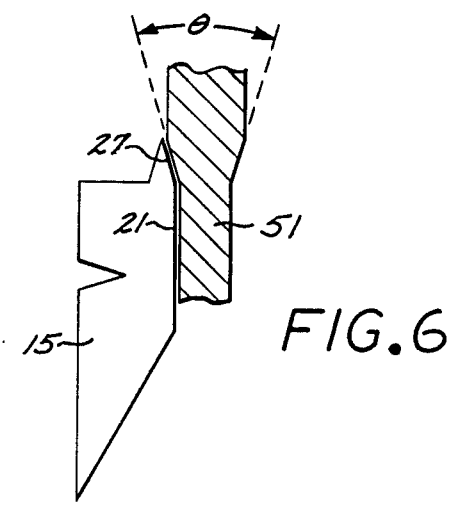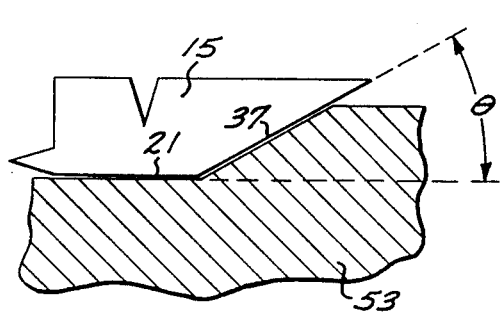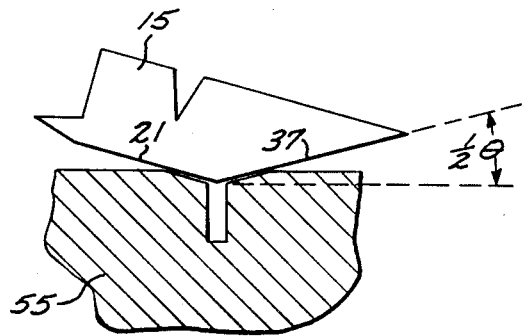

ANGLE GAGE

BACKGROUND OF THE INVENTION

1. Field of the Invention

This invention relates to angle gages, and more particularly, pertains to a template-type device with which angles are measured or verified by visual comparison.

2. Description of the Prior Art

In the manufacture of precision machined or stamped parts, it is essential that resulting edges, corners, and contours are within spec, including specifications pertaining to angles. The angular relationship between two surfaces may often be defined in a variety of ways, and comparison to surrounding or adjacent surfaces, may, in fact, comprise the best way of determining the accuracy and precision of a particular angle. Consequently, measurement of a given angle's complement, supplement, half its value, double its value or other common related values may actually provide the most advantageous approach toward making a precise determination. A production process may require such measurements to be made with great frequency, whereby a number of such related parameters are continually and repeatedly checked and rechecked to insure that a given specification is being met.

The prior art fails to provide a simple device with which a given angle's permutations in various orientations can readily be checked. A fully adjustable instrument is often bulky and cumbersome to use. Access to certain surfaces may therefore inherently be precluded, and/or a relatively high degree of skill may be required to determine which measured values are relevant to the verification of a specified angular relationship of two specified surfaces. Templates provide a simple alternative to an adjustable precision instrument, but in order to provide the necessary versatility required to measure a specified angle in a variety of forms or orientations, a large number of templates are required. This would again introduce an undesired degree of complexity and would require a reasonable amount of skill to make the determination as to which template would be useful in verifying the accuracy of a particular angular relationship. The present invention seeks to cure the above described disadvantages of the prior art and provides a simple and easy-to-use device with which the necessary angular determinations can readily be made.

SUMMARY OF THE INVENTION

The present invention provides an easy to use template-type angle gage, which provides most of the permutations or forms and orientations of a given angle on a single gage. A set of such gages, each individual gage pertaining to a different given angle, provides a simple yet versatile means for determining or verifying most angular relationships typically encountered by, for example, a machinist.

Each gage consists of a flat nine sided piece of rigid material, preferably stainless steel, the various edges and corners thereof being positioned and oriented so as to define angles all related to a preselected angle. A particular gage is demarked as pertaining to the preselected angle, and can be used to check internal, as well as external forms of the angle, the supplement of the angle, 90° plus half the angle, and 180° minus half the angle. This enables an angle specification to be quickly verified by simply selecting the gage demarked with the specified angle and placing an appropriate combination of its edges adjacent a convenient combination of surfaces for visual comparison. This allows unskilled labor to, for example, check a 60° chamfer or bevel angle without regard to the fact that the measurement actually being made relative to a convenient surface is, in fact, 90° plus half the angle or 120°. If the angle is within spec, one of the corners of the gage will give a precise fit. A precise fit with a wrong corner of the gage to give a false verification of a specified angle is highly unlikely as the actual angle would have to be substantially off spec and additionally, coincidently precisely equivalent to a related form of the angle specified. Only minor deviations are typically expected in a quality control type situation.

The shape of the gage that provides this capability and that which is the object of the present invention is best described as a modified rectangle having two converging projections extending therefrom and one converging indentation therein. The two projections extend from opposite sides of the rectangle and both convergencies define the preselected angle with which the gage is demarked. One projection comprises an isosceles shape whose base is shorter than the side from which it projects and adjacent one of the retangle's corners, while the other projection has one edge aligned with a third side of the rectangle and a base coinciding with the entire side from which it extends. The isosceles indentation similarly defines a convergence equivalent to the preselected angle and extends inwardly at a position approximately half way across that edge of the gage which includes the third side.

Other features and advantages of the present invention will become apparent from the following detailed description, taken in conjunction with the accompanying drawings, which illustrate by way of example, the principles of the invention,

BRIEF DESCRIPTION OF THE DRAWINGS

FIGS. 3-8 illustrate the gage of the present invention being used to gage a variety of forms and orientations of the same angle.

DETAILED DESCRIPTION OF THE INVENTION

Figure 1:
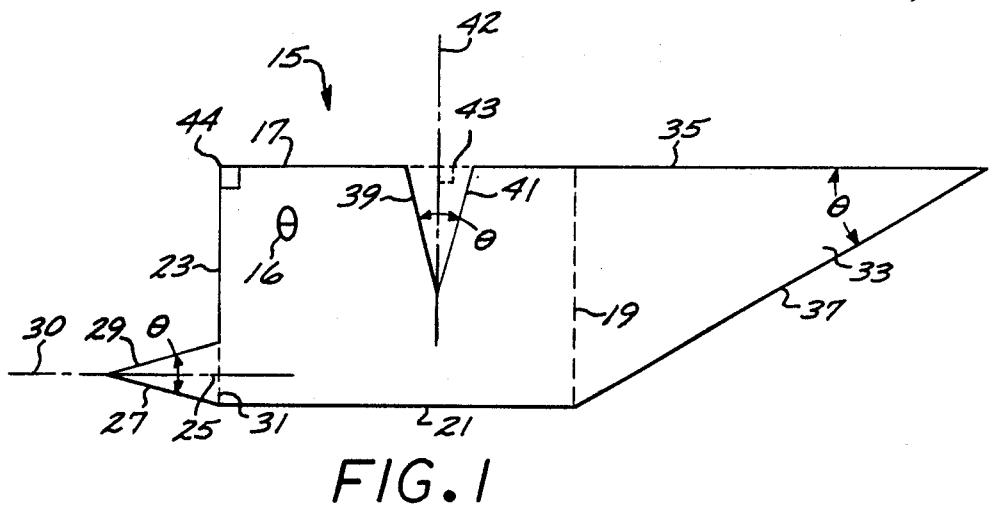
FIG. 1 illustrates a plan view of an embodiment of the present invention.
Figure 2:
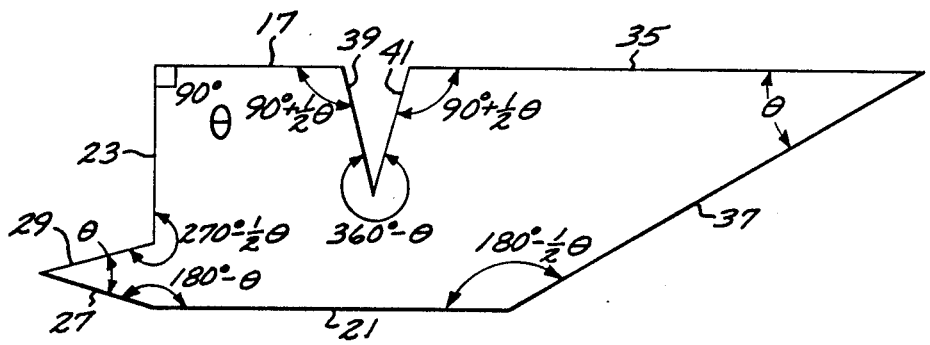
FIG. 2 is an illustration of the embodiment of FIG. 1 with relevant angles identified.

The gage of the present invention is a template-type device with which the accuracy of a specified angle is either measured or verified via visual comparison. Each gage consists of a single piece of flat and rigid material having very precisely positioned and oriented edges and corners. FIGS. 1 and 2 illustrate a generalized representative embodiment of the gage of the present invention and for the purposes of illustration and description pertains to a general angle "$\theta$".

As apparent in FIG. 1, the contour of the gage 15 of the present invention is best described as having the form of a modified rectangle, the rectangle being defined by lines 17/43, 19, 21, and 31/23. The rectangle has two projections 25 and 33 extending therefrom and one indentation defined by edges 39 and 41. The convergencies defined by the two projections and the indentation each subtend an angle of θ and the gage is engraved or otherwise permanently demarked with that same angle θ at 16. Edges 27 and 29 of the isosceles projection 25 are, by definition, of equal length. Additionally, it is thereby implicit that the bisector 30 of projection 25 is normal to base 31. The base 31 of projection 25 is selected to be shorter than the distance between sides 17 and 21, and is positioned at one corner of the rectangle. Projection 33 is defined by edges 35 and 37. The base 19 of projection 33 coincides with the entire length of the side of the rectangle. Edge 35 is collinear with edge 17/43. Edges 39 and 41 of the isosceles indentation are of equal length whereby bisector 42 is positioned normal to base 43. The position of the bisector 42 is substantially half way between the vertex of projection 33 and corner 44. Having thusly described the outline of the gage of the present invention, the angles of the various corners necessarily conform to the values set forth in FIG. 2.

Figure 9:
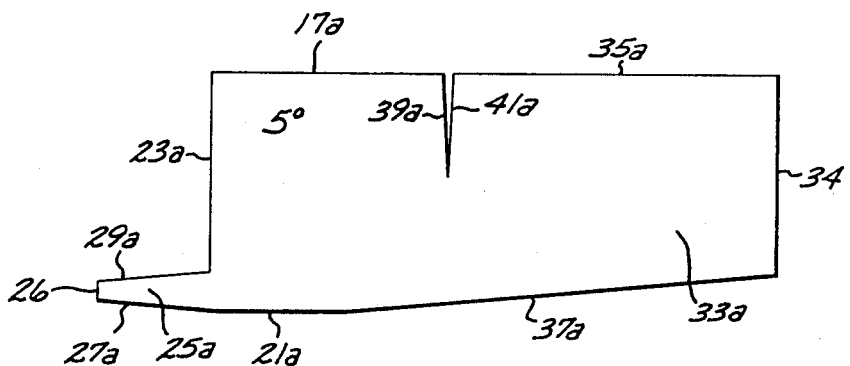
FIG. 9 illustrates a plan view of a gage of the present invention intended for the measurement of a very small angle.

The above-described generalized relationship of the various corners and edges of the gage of the present invention is maintained for any value of θ. A set of gages ranging from θ=5° to θ=90° in increments of 5° provides a versatile measuring tool. At extremely small angles, such as for example, at θ=5°, it is necessary to truncate projections 25a and 33a as shown in FIG. 9 to restrict the overall dimensions of the gage to a reasonable size.

FIGS. 3-8 illustrate the versatility of the gage 15 of the present invention. The illustrations show different contours where an angle of θ is specified, but which may not be directly measurable as such. FIG. 3 and 4 show the direct measurement of the internal and external forms of angle θ. The fact that the base of projection 33 extends along the entire length of the rectangle allows the gage to be used wholly within a contour as shown in FIG. 4. FIG. 5 illustrates an application where a bevel, chamfer or countersink is specified by the intersection of its projections as shown by the dotted lines. The dimensions of the contour are such that the use of edges 35 and 37, to directly measure θ are precluded. However, by measuring the bevel relative to the horizontal, which actually amounts to an angle of 90°+(½)θ, the specified angle θ can easily be verified. FIG. 6 again shows a situation where the specified angle θ is hard, if not impossible, to measure directly. In this case, comparison of the edges 21 and 27 to the exterior contour allows angle θ to be readily checked by actually measuring an angle of 180°−(½)θ. FIG. 7 illustrates the situation where the angle specified is most easily verified by measuring the supplement, which the corner between edges 21 and 37 readily provides. The supplement of angle θ is also sometimes convenient for the verification of bell-type countersinks as illustrated in FIG. 8.

In each case, wherein the accuracy of a specified angle equal to θ is to be verified, any of the relationships illustrated can be checked with a single gage conforming to the dimensions of the present invention. If the particular angular relationship of concern is within spec, one of the corners of the gage will give a precise fit without requiring calculation of the actual angle being measured. If on the other hand, the angular relationship is out of spec, non of the corners will give a precise fit. The coincidence that a wrong corner of the gage happens to give a precise fit to a related form of an out-of-spec angle is extremely unlikely, and would normally not be of concern.

While a particular form of the invention has been illustrated and described, it will also be apparent to those skilled in the art that various modifications can be made without departing from the spirit and scope of the invention. Accordingly, it is not intended that the invention be limited except as by the appended claims.

What is claimed is:

1. An angle gage for making an accuracy determination of a preselected angle by visual comparison, comprising:

a flat, rigid element having a contour defining a modified rectangle, the sides of the rectangle being modified such that, a first side of said rectangle has a converging isosceles projection extending therefrom, the convergence defining said preselected angle and the width of said projection being shorter than said first side;

a second side of said rectangle, parallel to said first side, has a converging projection extending therefrom, the convergence defining said preselected angle, the base of said projection coinciding with the entire length of said second side and an edge of said projection being perpendicular to said second side; and a third side of said rectangle, having formed therein a converging isosceles indentation, the convergence defining said preselected angle and the width of the indentation being shorter than said third side.

2. The angle gage of claim 1 wherein the isosceles projection on said first side is positioned such that an end of its base coincides with a end of said first side.

3. The angle gage of claim 2 wherein the third side is collinear with an edge of the projection extending from said second side and the isosceles indentation is substantially centered along the length which includes both the third side of the rectangle and the edge of the projection.

4. The angle gage of claim 3 wherein the projections extending from the first and second sides are truncated.

5. The angle gage of claim 3 wherein said rigid element is formed of stainless steel.

6. An angle gage for making an accuracy determination of a preselected angle, by visual comparison, comprising:

a flat and rigid nine-sided polygon whose nine corners define a sequence of interior angles of 90°; 90°+(½)θ; 360°−θ; 90°+(½)θ; θ; 180°−θ; 180°−(½)θ; θ; 270°−(½)θ; and wherein the four sides that define the 360°−θ corner and the second θ corner are of equal length.

* * * * *